United States Patent [19]

Tsui et al.

[11] Patent Number: 5,369,408
[45] Date of Patent: Nov. 29, 1994

[54] SELF-MIXING EXPENDABLE

[75] Inventors: James B. Y. Tsui, Centerville; David M. Lin, Xenia, both of Ohio

[73] Assignee: The United States of America as represented by the Secretary of the Air Force, Washington, D.C.

[21] Appl. No.: 517,639

[22] Filed: Apr. 23, 1990

[51] Int. Cl.⁵ .......................... G01S 7/38; H04K 3/00
[52] U.S. Cl. .......................... 342/6; 342/12; 342/13
[58] Field of Search .............................. 342/6, 12, 13

[56] References Cited

U.S. PATENT DOCUMENTS

| | | | |
|---|---|---|---|
| H646 | 6/1989 | Tsui | 343/895 |
| 3,108,275 | 10/1963 | Chisholm | 342/34 |
| 3,894,347 | 7/1975 | Sleven et al. | 342/12 X |
| 3,911,433 | 10/1975 | Redman | 342/53 |
| 3,962,657 | 6/1976 | Redman et al. | 342/171 X |
| 4,083,004 | 4/1978 | Cohn | 342/13 X |
| 4,130,059 | 12/1978 | Block et al. | 342/12 X |
| 4,419,669 | 12/1983 | Slager et al. | 342/6 |
| 4,446,793 | 5/1984 | Gibbs | 102/55 |
| 4,686,534 | 8/1987 | Eddy | 342/165 |
| 4,733,236 | 3/1988 | Matosian | 342/7 |
| 4,987,418 | 1/1991 | Kosowsky et al. | 342/6 |
| 5,036,323 | 7/1991 | Cain et al. | 342/6 |

Primary Examiner—John B. Sotomayor
Attorney, Agent, or Firm—Bernard E. Franz; Donald J. Singer

[57] ABSTRACT

This invention is directed to an expendable which includes an electronic circuit for introducing a simulated Doppler frequency shift. When dropped from an aircraft, the expendable is used to confuse hostile radar operations. In the past, the approach has been to use a high frequency electronic switch (PIN diode) and drive oscillator to change the impedance of the expendable antenna. This invention involves a simplification which combines the electronic switch and its drive oscillator into a single semiconductor component. By connecting a feedback circuit from the collector to the base of a high frequency transistor as well as to the two arms of the antenna, the antenna impedance is changed at the transistor oscillating frequency.

2 Claims, 1 Drawing Sheet

SELF-MIXING EXPENDABLE

RIGHTS OF THE GOVERNMENT

The invention described herein may be manufactured and used by or for the Government of the U.S. for all governmental purposes without the payment of any royalty.

BACKGROUND OF THE INVENTION

The invention relates to a self-mixing expendable.

The idea of introducing a simulated Doppler shift on expendables through electronic means is to confuse hostile radar operations. The basic approach is to use high frequency electronic switches (i.e. pin diodes) to change the impedance of the expendable antenna. With this arrangement, a frequency shift will be incorporated in the reflected radar signals. This frequency shift will confuse the radar operation as a Doppler frequency shift. This arrangement requires all the components including an antenna, electronic switches, oscillators and power supply be put on the expendable.

The following U.S. Patents are of interest:
U.S. Pat. No. 3,108,275 Chisholm
U.S. Pat. No. 4,445,793 Gibbs
U.S. Pat. No. 4,676,534 Eddy
U.S. Pat. No. 4,733,236 Matosian Chisholm shows in FIG. 1 a frequency shift reflection system comprising a horn antenna 1, a diode 3, and a single transistor drive oscillator 4. The transistor has a positive feedback circuit connected between its collector and base. Gibbs discusses the deployment of chaff (radar countermeasure dipoles) or other expendable materials from a moving aircraft. Eddy describes a radar target simulator and contains in column 2 a discussion of several prior art patents in this area. A discussion of prior art patents also appear in column 2 of Matosian which is directed to a multispectral reflecting target.

SUMMARY OF THE INVENTION

An objective of this invention is to simplify the design of expendables that can generate a simulated Doppler frequency shift to confuse hostile radar operation.

This invention is directed to an expendable which includes an electronic circuit for introducing a simulated Doppler frequency shift. When dropped from an aircraft the expendable is used to confuse hostile radar operations. In the past, the approach has been to use a high frequency electronic switch (PIN diode) and drive oscillator to change the impedance of the expendable antenna. This invention involves a simplification which combines the electronic switch and its driven oscillator into a single semiconductor component. By connecting a feedback circuit from the collector to the base of a high frequency transistor as well as to the arms of the antenna, the antenna impedance is changed at the transistor oscillating frequency.

DETAILED DESCRIPTION

Figure 1:
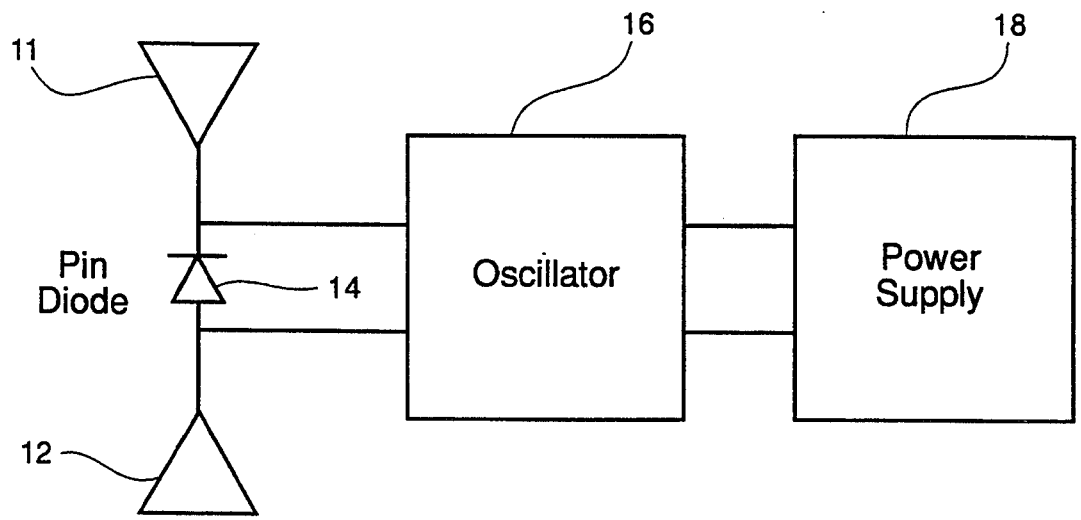
FIG. 1 diagram of a conventional prior art electronic circuit for use as an expendable.

One of the conventional approaches of making expendables with electronic switched is shown in FIG. 1. In this figure there is an antenna 11-12 and at the center of the antenna there is a pin diode 14 electronic switch. The pin switch is driven by the output of low frequency (few KHz) oscillator 16. When an incident wave is reflected by this expendable, a frequency shift will be introduced into the reflected wave. This returning wave will confuse a hostile radar operation. The oscillator 16 is driven by a power supply 18.

A U.S. Statutory Invention Registration (SIR) H646 issued Jun. 6, 1989 to Tsui shows a wideband self-mixing millimeter wave receiver which uses a diode at the center of a spiral antenna similar to the arrangement shown in FIG. 1, but used as a receiver.

Figure 2:
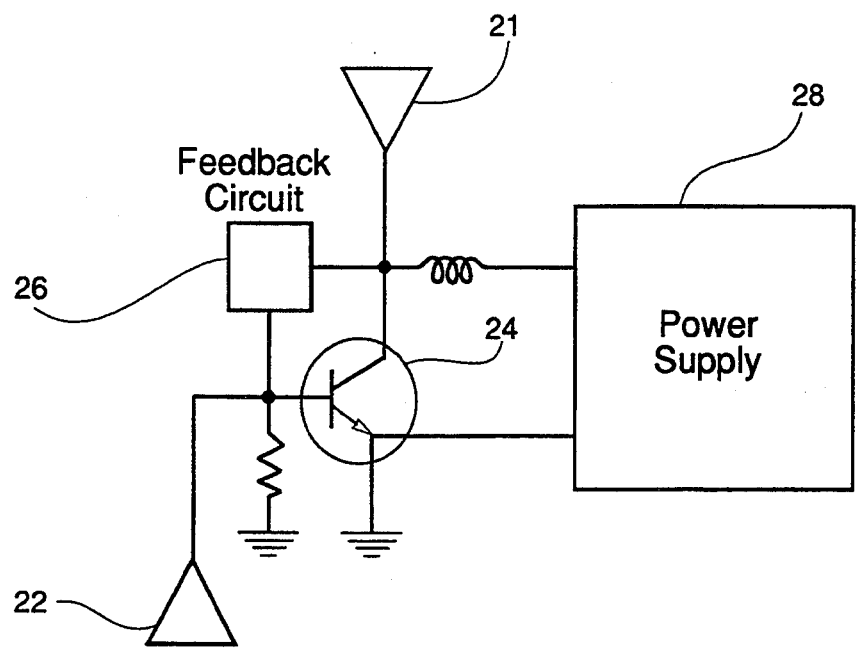
FIG. 2 is a diagram of a modified electronic circuit for use as a self-mixing expendable

This invention is to replace the pin diode switch and the low frequency oscillator by one high frequency transistor which can operate at the radar frequency. Although there might be many different kinds of designs, one suggested arrangement is shown in FIG. 2. In this figure, a feedback circuit 26 is connected from the collector to the base of the high frequency transistor 24. If the feedback circuit 26 is properly designed, the transistor will oscillate at some predetermined low frequency. The collector and the base of the transistor are also connected to the two arms 21 and 22 of an antenna. In this arrangement, the antenna impedance will be changed at the transistor oscillating frequency. If an incident wave is reflected by this expendable, the reflected wave will be shifted by the oscillating frequency. Other arrangements are also possible. For example, the antennas can be connected to the emitter and base, or connected to the emitter and collector of the transistor. The most effective arrangement should be determined experimentally.

It is understood that certain modifications to their invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed:

1. A radar reflecting device comprising an antenna, a transistor coupled to the antenna, a power supply coupled to the transistor, a feedback circuit coupled to the transistor so that it will oscillate at a predetermined frequency, so that the antenna impedance will be changed at said predetermined frequency, whereby if an incident wave is reflected the reflected wave will be shifted by said predetermined oscillating frequency; wherein said transistor has emitter, base and collector electrodes, the feedback circuit is connected from the collector electrode to the base electrode, and the antenna has two arms connected respectively to the collector and base electrodes.

2. A radar reflecting device according to claim 1, wherein the power supply is coupled to the collector and emitter electrodes of the transistor with an inductor between the power supply and the collector electrode, and wherein a resistor is connected between the base and emitter electrodes.

* * * * *